US009079601B2

(12) United States Patent
Faber et al.

(10) Patent No.: US 9,079,601 B2
(45) Date of Patent: Jul. 14, 2015

(54) BOX WITH HAND HOLES AND SPACER PANEL TO FACILITATE LIFTING AND CARRYING THE BOX

(71) Applicant: INTERNATIONAL PAPER COMPANY, Memphis, TN (US)

(72) Inventors: Richard D. Faber, Memphis, TN (US); Kenneth Buss, Collierville, TN (US); Alex D. Bevier, Olive Branch, MS (US); Brian K. Jambois, Little Elm, TX (US); Adam P. Roberts, Germantown, TN (US)

(73) Assignee: INTERNATIONAL PAPER COMPANY, Memphis, TN (US)

( * ) Notice: Subject to any disclaimer, the term of this patent is extended or adjusted under 35 U.S.C. 154(b) by 0 days.

(21) Appl. No.: 14/076,345

(22) Filed: Nov. 11, 2013

(65) Prior Publication Data

US 2014/0061080 A1 Mar. 6, 2014

Related U.S. Application Data

(63) Continuation of application No. PCT/US2013/026404, filed on Feb. 15, 2013.

(60) Provisional application No. 61/724,457, filed on Nov. 9, 2012, provisional application No. 61/599,600, filed on Feb. 16, 2012.

(51) Int. Cl.
| B65D 5/42 | (2006.01) |
| B65D 5/468 | (2006.01) |
| B62B 3/10 | (2006.01) |

(Continued)

(52) U.S. Cl.
CPC . *B62B 3/108* (2013.01); *B42F 7/14* (2013.01); *B62B 3/005* (2013.01); *B65D 5/4208* (2013.01); *B65D 5/4608* (2013.01); *B65D 5/48024* (2013.01)

(58) Field of Classification Search
CPC .... B42F 7/14; B65D 5/48024; B65D 5/0083; B62D 3/02; B62D 5/4208; B62D 5/4608
USPC .............. 206/449, 814, 821, 593, 521.7, 585, 206/588, 499; 229/120.13, 120.19, 120.21, 229/120.28, 120.34
See application file for complete search history.

(56) References Cited

U.S. PATENT DOCUMENTS

| 1,199,790 A | 10/1916 | Holcomb |
| 1,647,581 A * | 11/1927 | Redemski ..................... 206/525 |

(Continued)

FOREIGN PATENT DOCUMENTS

| AT | 008447 | 8/2006 |
| DE | 20202320 | 5/2002 |

(Continued)

*Primary Examiner* — Mickey Yu
*Assistant Examiner* — Chun Cheung
(74) *Attorney, Agent, or Firm* — Thomas W. Barnes, III

(57) ABSTRACT

A carton has hand holes in opposite walls and a spacer panel inserted between stacked articles in the carton. The spacer panel has cut outs in its opposite ends positioned behind the hand holes to provide space for inserting the fingers. The hand holes and spacer panel facilitate lifting, carrying and manipulating the carton. The spacer panel has width and length dimensions to fit within the interior width and length dimensions of the carton and reinforces the carton to reduce damage when the carton is dropped.

18 Claims, 5 Drawing Sheets

(51) Int. Cl.
*B42F 7/14* (2006.01)
*B65D 5/49* (2006.01)
*B62B 3/00* (2006.01)

(56) References Cited

U.S. PATENT DOCUMENTS

| | | | |
|---|---|---|---|
| 2,257,977 A * | 10/1941 | Richard | 229/120 |
| 2,716,558 A | 8/1955 | Sullivan | |
| 2,805,077 A | 9/1957 | Katz | |
| 3,042,461 A | 7/1962 | Smith | |
| 3,086,690 A * | 4/1963 | Beck | 229/120.04 |
| 3,135,527 A | 6/1964 | Knapp | |
| 3,198,300 A | 8/1965 | Tuttle | |
| 3,302,955 A | 2/1967 | Witzgall | |
| 3,337,285 A | 8/1967 | Travis | |
| 3,487,479 A * | 1/1970 | Grooms | 5/93.1 |
| 3,492,016 A | 1/1970 | O'Connor et al. | |
| 3,593,387 A | 7/1971 | Georgi | |
| 3,680,810 A | 8/1972 | Jarmalow | |
| 3,853,285 A | 12/1974 | Woodring | |
| 3,954,226 A | 5/1976 | Pickering | |
| 3,982,613 A | 9/1976 | Wood | |
| 4,058,250 A | 11/1977 | Akkerman | |
| 4,060,252 A | 11/1977 | Mowery | |
| 4,068,779 A | 1/1978 | Canfield | |
| 4,128,253 A | 12/1978 | Powers | |
| 4,311,288 A | 1/1982 | Galland | |
| 4,416,429 A | 11/1983 | Jessamine | |
| 4,772,035 A | 9/1988 | Danial | |
| 4,940,252 A | 7/1990 | Seib | |
| 4,969,610 A | 11/1990 | Taylor et al. | |
| 5,284,247 A | 2/1994 | Turner | |
| 5,316,210 A * | 5/1994 | Scullin | 229/117.16 |
| 5,356,031 A | 10/1994 | Jondelius | |
| 5,403,023 A | 4/1995 | Tsai | |
| 5,445,396 A | 8/1995 | Sebor | |
| 5,551,715 A | 9/1996 | Pickard | |
| 5,709,008 A | 1/1998 | Dickinson | |
| 5,898,472 A | 4/1999 | Oshikawa | |
| 5,927,450 A | 7/1999 | Sadow | |
| 6,199,879 B1 | 3/2001 | Cino et al. | |
| 6,244,502 B1 * | 6/2001 | Hollar et al. | 229/120.011 |
| 6,979,005 B1 | 12/2005 | McLerran | |
| 6,983,946 B2 | 1/2006 | Sullivan et al. | |
| 7,249,729 B2 | 7/2007 | Moritz | |
| 7,431,235 B2 | 10/2008 | Moritz | |
| 7,845,894 B2 | 12/2010 | Dickinson et al. | |
| 8,205,399 B2 | 6/2012 | Ralston | |
| 2001/0038778 A1 | 11/2001 | Tatina | |
| 2005/0006861 A1 | 1/2005 | Dubois et al. | |
| 2005/0269791 A1 | 12/2005 | Hoiriis et al. | |
| 2010/0001054 A1 | 1/2010 | Brittain | |
| 2010/0147642 A1 | 6/2010 | Andochick | |
| 2012/0223129 A1 | 9/2012 | Oppenheimer | |

FOREIGN PATENT DOCUMENTS

| | | |
|---|---|---|
| DE | 20316226 | 3/2004 |
| EP | 0009921 | 4/1980 |
| EP | 0410772 | 1/1990 |
| EP | 0519366 | 12/1992 |
| EP | 1375362 | 1/2004 |
| FR | 2741852 | 11/1995 |
| FR | 2865446 | 1/2004 |
| FR | 2898341 | 9/2007 |
| GB | 372119 | 5/1932 |
| GB | 1480726 | 7/1977 |
| GB | 2471309 | 12/2010 |
| WO | 9419642 | 9/1994 |
| WO | 2009027992 | 3/2009 |
| WO | 2009046775 | 4/2009 |
| WO | 2010033029 | 3/2010 |

* cited by examiner

BOX WITH HAND HOLES AND SPACER PANEL TO FACILITATE LIFTING AND CARRYING THE BOX

FIELD OF THE INVENTION

This invention relates generally to boxes. In particular, the invention relates to a box having hand holes and a spacer panel defining recesses behind the hand holes for insertion of the fingers to facilitate lifting and carrying of the box. In a specific embodiment the box is a carton designed to hold multiple reams of cut sheets of paper.

BACKGROUND ART

Conventional boxes and cartons are normally picked up and carried by placing the hands under the bottom of the box or carton, or sometimes by grasping straps wrapped around the box when straps are present. Conventional cartons designed for holding cut sheets of paper are formed of corrugated cardboard and typically hold 10 wrapped reams of 500 sheets each. These cartons of paper weigh 50 pounds or more, depending upon the bond rating of the paper. For example, a single ream of standard 20 lb. bond paper weighs 5 pounds and a single ream of 24 lb. bond paper weighs 6 pounds, whereby a carton of 10 reams of 20 lb. bond paper weighs 50 pounds and a carton of 10 reams of 24 lb. bond paper weighs 60 pounds. These boxes are relatively heavy and difficult to handle by most consumers.

Some conventional boxes and cartons have hand holes in opposed walls to facilitate lifting and carrying of them, but there is no spacer panel defining recesses behind the hand holes to provide space for insertion of the fingers through the hand holes. Cartons holding cut sheets of paper normally do not have hand holes in them.

Consumers wishing to purchase one or more cartons of paper typically either order the paper to be delivered to their home or office location, or go to a point of sale to acquire the paper. In the former instance, even after the carton has been delivered to their location, the consumer generally either has to lift the carton of paper and carry it to its point of use, or lift the carton onto a cart for transport to the point of use and then again lift the carton to remove it from the cart. In the latter instance, when the consumer drives to a point of sale to acquire the paper, the consumer either has to lift and carry the carton to check-out, or select a shopping cart and push the cart to where the cartons of paper are displayed, then lift the carton into the cart and push the cart to check-out. After purchase, the consumer again has to lift the carton of paper to remove it from the cart and place it in his or her vehicle. Upon reaching their destination, the consumer again has to lift the carton to remove it from the vehicle and either carry the carton into his or her home or office or place it on a cart to transport it to its point of use. This multiple lifting of the relatively heavy cartons of paper from a variety of carts, dollies and shopping carts increases the possibility for personal injury to the consumer.

Container handling is the third largest source of injury and illness in the private sector and is the largest source of injury and illness in the retail trade. Boxes of photocopy paper are among the heaviest items that employees are required to lift in the office. Data indicates that manual material handling (MMH) is among the most frequent and severe causes of injury worldwide, and 35%-40% of workplace injury costs are related to MMH, with 1.8 million U.S. workers experiencing work related musculoskeletal disorders (WMSD's) each year.

Manual handling issues that affect the ease and safety of the lift include: weight of the object; horizontal location of the object; vertical location of the object; vertical travel distance; asymmetry/twisting; frequency; duration; coupling; posture; and if mechanical contact stress is present.

It would be advantageous to have a container, especially a container for cut sheets of paper, wherein the container has hand holes in the sides with space for inserting the fingers through the hand holes, to facilitate lifting and carrying of the container and thereby minimize the incidences of injury that occur with conventional containers.

SUMMARY OF THE INVENTION

In a preferred embodiment the box of the invention comprises a standard corrugated paper carton having a bottom wall, opposite side walls, opposite end walls, and a removable lid or cover, and is designed to hold 10 reams of paper, but it should be understood that the principles of the invention could be applied to containers made of other materials and having other capacities and designed for other goods.

The carton of the invention has hand holes in its opposite ends and a spacer panel with cut outs in its opposite ends is inserted between the reams of paper with the cut outs positioned behind the hand holes to provide clearance for the fingers when they are inserted through the hand holes. The fingers then engage beneath superjacent reams of paper to exert force against the paper to lift the carton.

In a preferred embodiment the cut outs in the ends of the spacer panel are shaped to minimize damage to adjacent sheets of paper, and a punch-out foldable panel is provided in the hand holes to close them until they are used to lift the carton.

Although the carton has been described as holding 10 reams of paper, it should be understood that the invention is applicable to cartons holding a different number of cut sheets of paper, or to cartons for holding other objects and which have a weight that makes them difficult to handle in a conventional manner.

The hand holes allow the user to lift a carton from the floor without having to get his or her hands completely under the carton, thereby reducing the extent to which the user has to bend over to lift the carton. The hand holes also provide secure grip and control of the carton, enabling it to be easily maneuvered and cleanly lifted and carried, thus limiting the risk of product damage and injury to the user due to accidentally dropping the carton. Further, the hand holes allow the carton to be fully placed before releasing it, thus limiting the risk of product damage and injury to the user due to intentional dropping.

BRIEF DESCRIPTION OF THE DRAWINGS

The foregoing, as well as other objects and advantages of the invention, will become apparent from the following detailed description when taken in conjunction with the accompanying drawings, wherein like reference characters designate like parts throughout the several views, and wherein:

FIG. 11 is a lifting index table for a conventional ten ream carton.

FIG. 12 is a lifting index table for a ten ream carton having the hand holes and spacer panel of the present invention.

FIG. 13 is a lifting index table for an eight ream carton having the hand holes and spacer panel of the present invention.

DETAILED DESCRIPTION OF THE PREFERRED EMBODIMENTS

Figure 1:
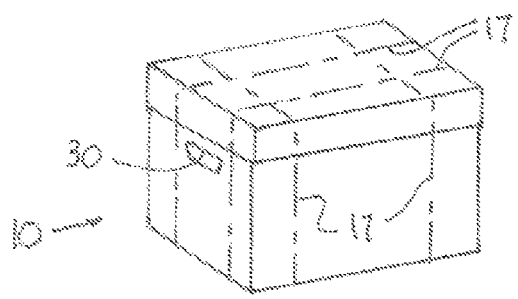
FIG. 1 is a top isometric view of a carton having hand holes and a spacer panel according to the invention, shown in its shipping configuration with straps applied around the carton.
Figure 2:
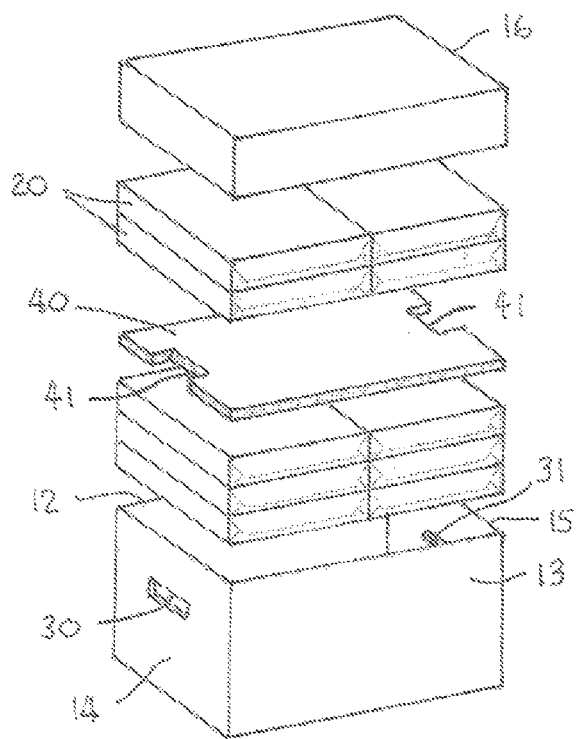
FIG. 2 is a top isometric exploded view of the carton of FIG. 1.
Figure 3:
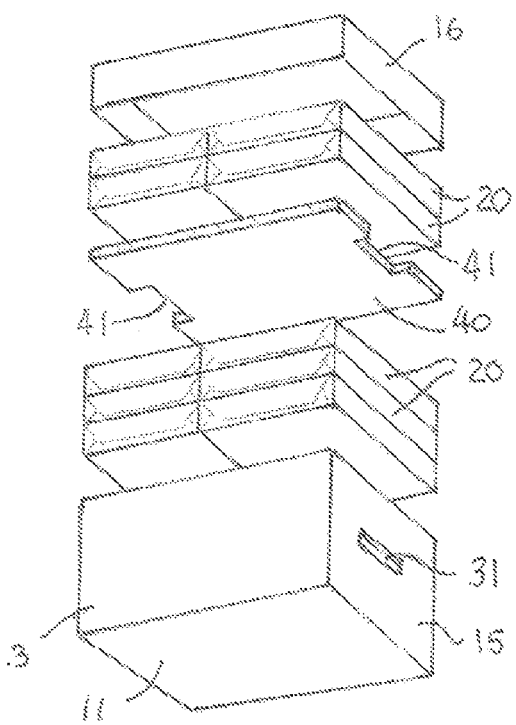
FIG. 3 is a bottom isometric exploded view of the carton of FIG. 1.

Referring more specifically to the drawings, a carton according to the invention is indicated generally at 10 in FIGS. 1-3. The carton has a bottom wall 11, opposite side walls 12 and 13, opposite end walls 14 and 15, and a lid or cover 16 covering the open top of the carton. Tie straps 17 may be placed longitudinally and/or transversely around the carton, as shown in broken lines in FIG. 1. The carton as shown and described herein is intended for containing wrapped reams 20 of cut sheets of paper. In the example shown in FIGS. 2 and 3, there are ten reams of paper, but it should be understood that the invention is not limited to a carton for ten reams, or even to a carton for reams of paper.

In accordance with the invention, the carton 10 has hand holes 30 and 31 cut in its opposite ends, respectively, and a spacer panel 40 is inserted in the carton between the layers of reams of paper 20. A cut out or recess 41 is formed in each end of the panel 40 and the panel is positioned so that these cut outs are behind and in registry with the respective hand holes 30 and 31. When the carton contains reams of paper 20, the spacer panel and cut outs provide room for inserting the fingers between the reams of paper so that lifting force can be exerted against superjacent reams to lift the carton. The panel 40 can comprise a sheet of honeycomb material or other material to provide the necessary space for inserting the fingers. In a preferred embodiment, the panel 40 has a thickness of about one inch and each of the cut outs 41 has a width of about four inches and a depth of from about three inches to about four and one-half inches at its deepest point. The cut outs 30 and 31 preferably have a width of about four inches and a height of about one and one-half inches. The spacer panel has width and length dimensions to fit within the interior width and length dimensions of the carton and reinforces the carton to reduce damage when the carton is dropped.

In the embodiment shown in FIGS. 2 and 3, the hand holes 30 and 31 are completely cut out openings. In a preferred construction, the cut outs have a height of about one and one-half inches.

Figure 4:
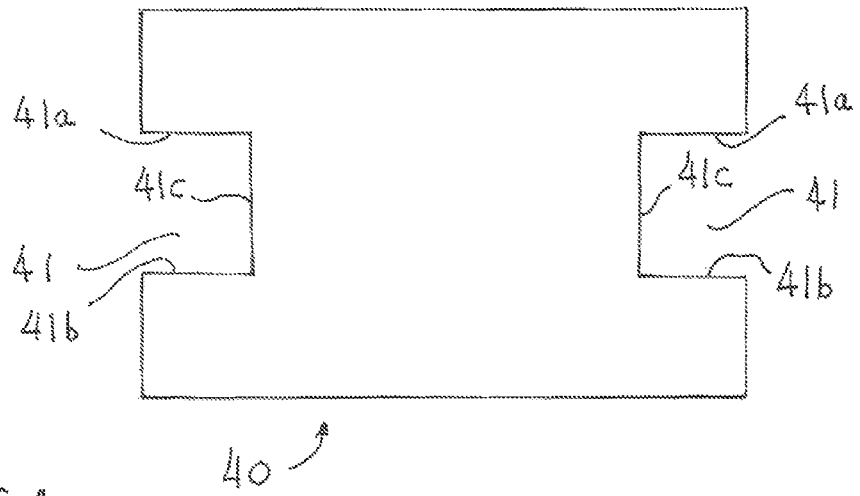
FIG. 4 is a plan view of the spacer panel shown in FIGS. 2 and 3.

As shown in FIG. 4, the cut outs 41 in the ends of the spacer panel 40 are rectangularly shaped, with parallel side edges 41a, 41b each having a length of about three inches, and a straight back edge 41c having a length of about four inches and connected between the inner ends of the side edges.

Figure 5:
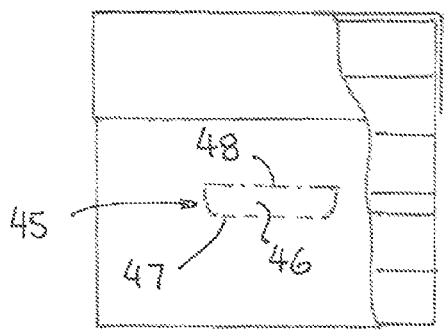
FIG. 5 is an end view of a carton according to the invention, with a portion shown in section, wherein the carton has a second embodiment of hand hole that is formed by a punch-out panel that is joined to the end wall of the carton by a perforated line along the bottom and side edges of the panel and by a fold along its top edge so that when the panel is pushed inwardly the perforated line fractures and the panel folds upwardly and inwardly of the carton.
Figure 6:
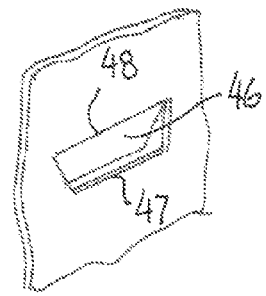
FIG. 6 is an enlarged, fragmentary isometric view of the hand hole of FIG. 5, looking from outside the carton.
Figure 7:
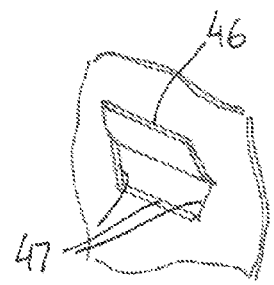
FIG. 7 is an enlarged, fragmentary isometric view of the hand hole of FIG. 5, looking from the inside of the carton.

FIGS. 5-7 depict a different embodiment of hand hole 45, wherein the hand hole is formed by a punch-out panel 46 joined to the carton end wall along its bottom and side edges by a perforated line 47, and along its top edge by a fold 48 so that when the panel is pushed inwardly the perforated line fractures and the panel folds upwardly and inwardly of the carton.

Figure 8:
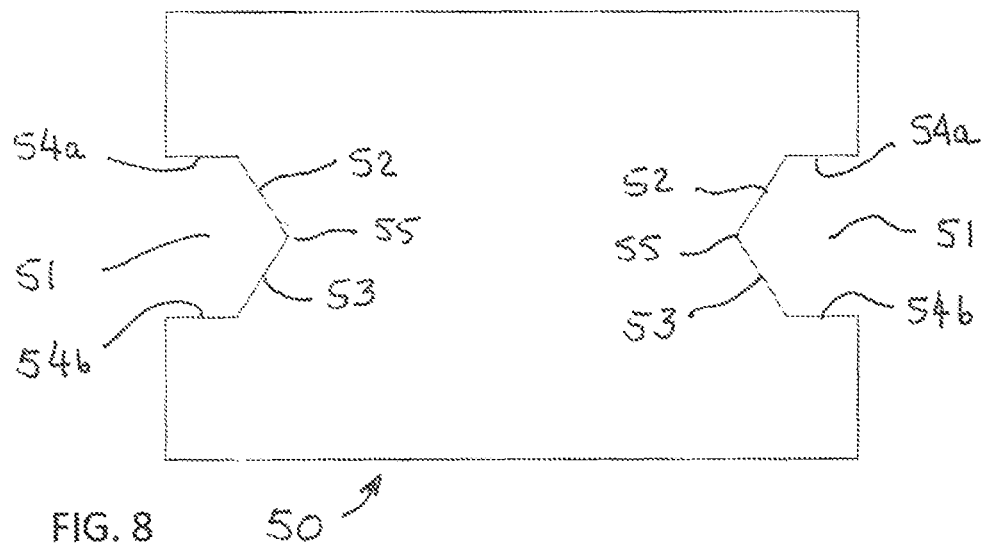
FIG. 8 is a plan view of a preferred form of spacer panel wherein the cut outs in its opposite ends are shaped to minimize damage to adjacent reams of paper.
Figure 9:
FIG. 9 is a longitudinal sectional view taken along line 9-9 in FIG. 8.

FIG. 8 depicts a spacer panel 50 having a preferred embodiment of cut out 51, wherein substantially equal outer ends 52 and 53 of the back edge are angled forwardly at about 30° and intersect respective parallel side edges 54a and 54b spaced about 40% closer to the end of the panel than the back edge in the FIG. 2 embodiment. In this embodiment, the deepest point 55 of the cut out, where the angled edges 52 and 53 meet in the middle, is spaced approximately three inches from the end of the panel, the parallel side edges 51a and 51b each have a length of about one and three-quarter inches, and the side edges are spaced apart about four inches. Damage to the reams of paper is minimized with this shape of cut out, wherein the back corners of the cut out are beveled.

Figure 10:
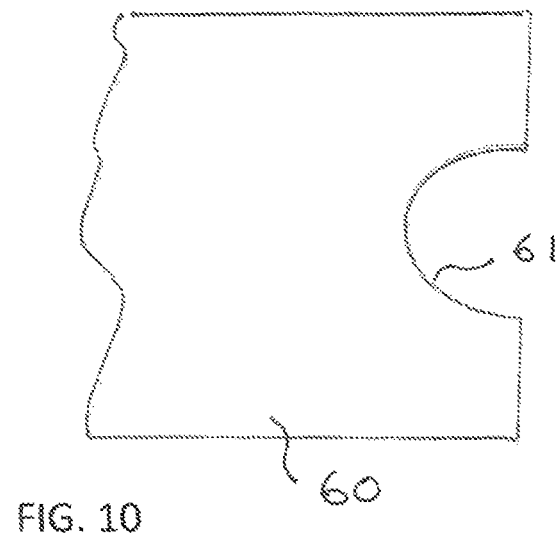
FIG. 10 is a fragmentary plan view of an end of the spacer panel, wherein the cut outs in the ends of the panel have a rounded shape.

Cut outs of alternate shape are shown in the spacer panel 60 of FIG. 10, wherein the cut outs have a curvilinear shape 61. This shape cut out has the same advantages as the cut out shown in FIG. 8.

Revised National Institute of Occupational Safety and Health (NIOSH) Lifting Guidelines were used to quantify the differences between a conventional 10-ream carton and an 8-ream and a 10-ream carton having hand holes and a spacer panel according to the invention. See FIGS. 11-13. The differences between cartons according to the invention and conventional cartons that are reflected in the Revised NIOSH Lifting calculations include improved coupling, reduced horizontal distance of the hands away from the body, and increased vertical distance of the hands above the floor for both the 8-ream and 10-ream cartons of the invention, as well as decreased load weight for the 8-ream carton. For each of these calculations, variables that are not affected by features of the cartons according to the invention (vertical distance traveled, asymmetry, and frequency) were assumed to be under ideal conditions and the load was assumed to be lifted off of the floor.

Figures 11, 12:
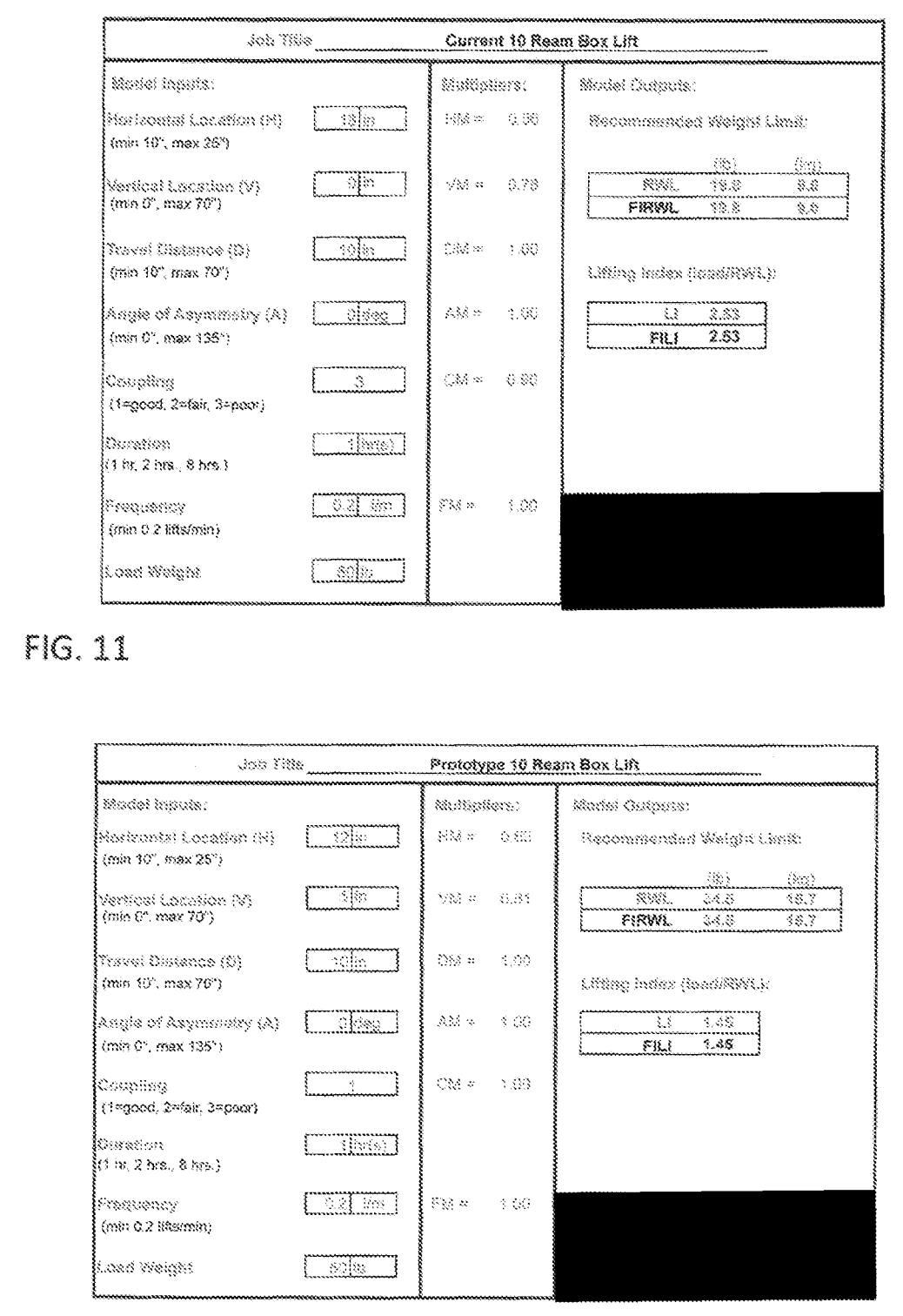

As shown in FIG. 11, the lifting index for a conventional ten ream carton was calculated to be 2.53, with a recommended safe weight limit of 19.8 lbs.

Figure 13:
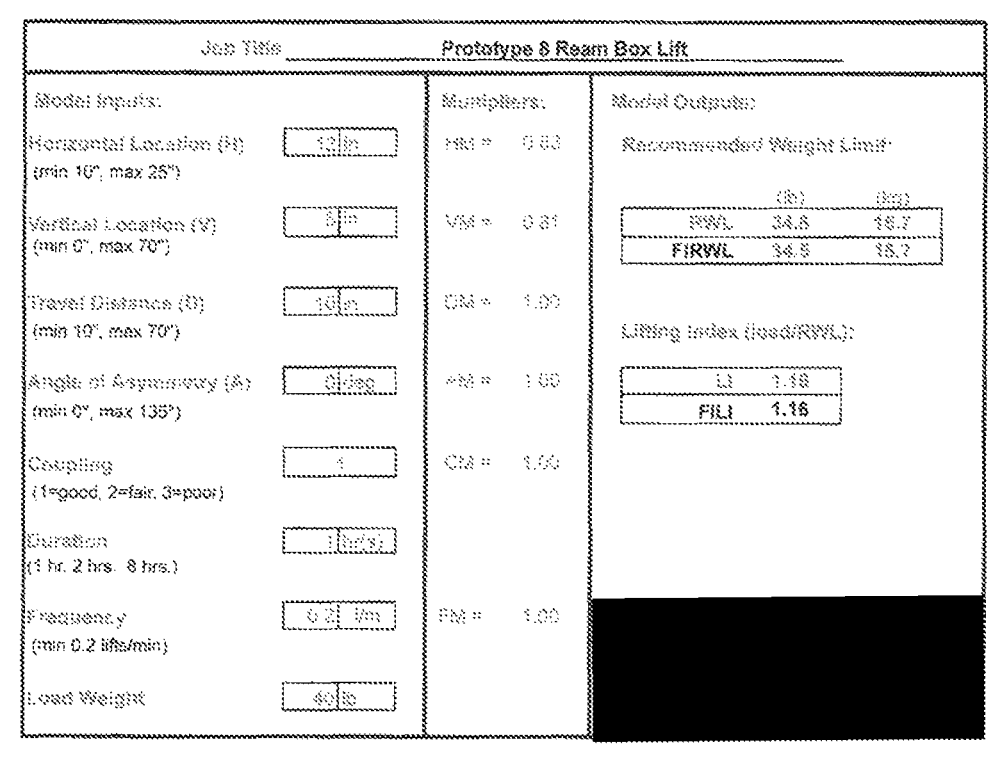

The lifting index scores for cartons made according to the invention were significantly less. As shown in FIG. 12, the lifting index for the 10-ream carton of the invention was calculated to be 1.45, and as shown in FIG. 13, for the 8-ream carton was calculated to be 1.16.

Drop tests were conducted with ten 8½"×11" reams of Hammermill Copy Plus 20 lb copy paper produced at the International Paper Company Sumter Mill in Sumter, S.C. Five cases were drop tested six times, once on each package face. Five additional cases were drop tested seven times, once on each package face and once on a corner. The packages were conditioned at 73° F./50% RH for 24 hours prior to testing.

Prior to testing, the cases were labeled to identify the exterior surfaces or faces of the package. Corresponding with the package top, the following identification was consistent for all units tested.

Face 1=Top of Ream Package
Face 2=Length panel of Ream Package
Face 3=Bottom of Ream Package
Face 4=Opposite Length panel of Ream Package
Face 5=Width panel of Ream Package
Face 6=Opposite Width panel of Ream Package Five sample packages were dropped six times from a height of 12 inches in the following format:
Drop 1–Face 2 Length
Drop 2–Face 4 Length
Drop 3–Face 3 Bottom
Drop 4–Face 6 Width
Drop 5–Face 1 Top
Drop 6–Face 5 Width Five sample packages were dropped seven times from a height of 12 inches in the following format:
Drop 1–Face 2 Length
Drop 2–Face 4 Length
Drop 3–Face 3 Bottom
Drop 4–Face 6 Width
Drop 5–Face 1 Top
Drop 6–Face 5 Width
Drop 7–Corner 2-3-5

A honeycomb spacer panel was placed between the second and third paper layers (as counted from the bottom of the package) within each case. The honeycomb spacer panel aligned with the case hand holes along the case width. The samples were banded for this testing.

Once drop tested, the paper ream tears were rated according to the Ream Damage rating table below. Generally, the longer the tear the greater the damage (severity) value.

| Ream Damage Rating | |
| --- | --- |
| Tear Length | Scale Value |
| <½" | 1 |
| ½"-1" | 2 |
| 1"-1½" | 3 |
| 1½"-2" | 4 |
| 2"-3" | 5 |
| >3" | 6 |

The tables below summarize the ream tear results.

| Hammermill Copy Paper - Item #105007 Conventional Production Carton (Reference Lab Test Record #120988 - Sample A) | | |
| --- | --- | --- |
| Test Variable | Average # Reams Torn | Average Severity of Tear |
| Six Drop Series | 1.4 | 0.3 |
| Seven Drop Series | 5.6 | 3.3 |

| Hammermill Copy Paper - Item #105007 Printed Carton with ¾" Lightweight Honeycomb Spacer Panel (Reference Lab Test Record #111755 - Sample C) | | |
| --- | --- | --- |
| Test Variable | Average # Reams Torn | Average Severity of Tear |
| Six Drop Series | 1.5 | 0.2 |
| Seven Drop Series | 5.3 | 2.2 |

| Hammermill Copy Paper - Item #105007 Kraft CAD Carton with 1" C3 Honeycomb Spacer Panel (Reference Lab Test Record #121165) | | |
| --- | --- | --- |
| Test Variable | Average # Reams Torn | Average Severity of Tear |
| Six Drop Series | 0.8 | 0.2 |
| Seven Drop Series | 3.8 | 3.4 |

As can be seen, the severity of tear was substantially reduced when either a ¾ inch spacer panel or a 1 inch spacer panel was placed in the carton according to the invention. When a 1 inch thick spacer panel was placed in the carton according to the invention the average number of reams torn was substantially reduced in both the six drop series and the seven drop series, and the severity of tear was reduced in the six drop series.

While particular embodiments of the invention have been illustrated and described in detail herein, it should be understood that various changes and modifications may be made in the invention without departing from the spirit and intent of the invention as defined by the appended claims.

What is claimed is:

1. A carton, comprises:
cut sheets of paper;
a bottom wall, opposite side walls, and opposite end walls;
a hand hole in each of the opposite end walls through which fingers may be inserted for lifting the carton; and
a generally planar spacer panel inserted in said carton between layers of said sheets of paper, said spacer panel having opposing ends, each end having an outer edge and a cut out extending inwardly from said outer edge such that said cut out is open at said outer edge and located in substantially the same plane as generally the entirety of said spacer panel, said cut outs being in registry with said hand holes to provide space for inserting the fingers between the layers of the sheets of paper to facilitate lifting the carton, wherein said spacer panel is generally parallel to said bottom wall.

2. A carton as claimed in claim 1, wherein:
said spacer panel has width and length dimensions to fit closely within the width and length dimensions of the interior of the carton.

3. A carton as claimed in claim 2, wherein:
said cut outs are rectangularly shaped.

4. A carton as claimed in claim 2, wherein:
said cut outs are curvilinear.

5. A carton as claimed in claim 2, wherein:
said cut outs have spaced parallel side edges and a back edge comprising opposite ends that meet at a point at the middle of the back edge and diverge angularly outwardly and forwardly to an inner end of a respective side edge.

6. A carton as claimed in claim 5, wherein:
said hand holes each comprise a punch-out panel joined to a respective said end wall by perforated line extending along a bottom and opposite side edges of said panel, and a fold along a top edge of said panel, whereby when said punch-out panel is pushed inwardly the perforated line fractures and the punch-out panel folds inwardly and upwardly against an inner surface of a respective said end wall.

7. A carton as claimed in claim 1, wherein:
said hand holes each comprise a punch-out panel joined to a respective said end wall by a perforated line extending along a bottom and opposite side edges of said panel, and a fold along a top edge of said panel, whereby when said punch-out panel is pushed inwardly the perforated line fractures and the punch-out panel folds inwardly and upwardly against an inner surface of a respective said end wall.

8. A carton as claimed in claim 1, wherein each of said cut outs extends in a plane generally parallel with said bottom wall.

9. A carton as claimed in claim 1, wherein said spacer panel has a width, a length and a thickness, the width and length both being greater in size than the thickness and the spacer panel thickness extending generally in a vertical direction.

10. A carton, comprises:
articles;
a bottom wall, opposite side walls, and opposite end walls;
a hand hole in each of said end walls; and
a generally planar spacer panel inserted in said carton between said articles, said spacer panel having opposing ends, each end having an outer edge and a cut out extending inwardly from said outer edge such that said cut out is open at said outer edge and located in substantially the same plane as generally the entirety of said spacer panel, said cut outs being behind and in registry with said hand holes to provide space for fingers inserted through said hand holes, wherein said spacer panel is generally parallel to said bottom wall.

11. A carton as claimed in claim 10, wherein:
said spacer panel has width and length dimensions to fit closely within the width and length dimensions of the interior of the carton.

12. A carton as claimed in claim 10, wherein:
said cut outs are rectangularly shaped.

13. A carton as claimed in claim 10, wherein:
said cut outs are curvilinear.

14. A carton as claimed in claim 10, wherein:
said cut outs have spaced parallel side edges and a back edge comprising opposite ends that meet at a point at the middle of the back edge and diverge angularly outwardly and forwardly to an inner end of a respective side edge.

15. A carton as claimed in claim 11, wherein:
said hand holes each comprise a punch-out panel joined to a respective said end wall by a perforated line extending along a bottom and opposite side edges of said panel, and a fold along a top edge of said panel, whereby when said punch-out panel is pushed inwardly the perforated line fractures and the punch-out panel folds inwardly and upwardly against an inner surface of a respective said end wall.

16. A carton as claimed in claim 14, wherein:
said hand holes each comprise a punch-out panel joined to a respective said end wall by perforated line extending along a bottom and opposite side edges of said panel, and a fold along a top edge of said panel, whereby when said punch-out panel is pushed inwardly the perforated line fractures and the punch-out panel folds inwardly and upwardly against an inner surface of a respective said end wall.

17. A carton as claimed in claim 10, wherein each of said cut outs extends in a plane generally parallel with said bottom wall.

18. A carton as claimed in claim 10, wherein said spacer panel has a width, a length and a thickness, the width and length both being greater in size than the thickness and the spacer panel thickness extending generally in a vertical direction.

* * * * *